US009616525B2

(12) United States Patent
Jouanneau et al.

(10) Patent No.: US 9,616,525 B2
(45) Date of Patent: Apr. 11, 2017

(54) LASER NOZZLE WITH MOBILE ELEMENT OF IMPROVED EXTERNAL PROFILE

(71) Applicant: L'Air Liquide, Société Anonyme pour l'Etude et l'Exploitation des Procédés Georges Claude, Paris (FR)

(72) Inventors: Thomas Jouanneau, Grenoble (FR); Philippe Lefebvre, Meulan (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 239 days.

(21) Appl. No.: 14/504,883

(22) PCT Filed: Feb. 13, 2013

(86) PCT No.: PCT/FR2013/050291
§ 371 (c)(1),
(2) Date: Oct. 2, 2014

(87) PCT Pub. No.: WO2013/150195
PCT Pub. Date: Oct. 10, 2013

(65) Prior Publication Data
US 2015/0336210 A1 Nov. 26, 2015

(30) Foreign Application Priority Data
Apr. 4, 2012 (FR) .................................. 12 53089

(51) Int. Cl.
B23K 26/142 (2014.01)
B23K 26/14 (2014.01)
(Continued)

(52) U.S. Cl.
CPC ...... B23K 26/0876 (2013.01); B23K 26/0639 (2013.01); B23K 26/1476 (2013.01); B23K 26/1488 (2013.01); B23K 26/38 (2013.01)

(58) Field of Classification Search
CPC ...... B23K 26/12; B23K 26/14; B23K 26/142; B23K 26/38
(Continued)

(56) References Cited

U.S. PATENT DOCUMENTS 4,031,351 A 6/1977 Martin
4,733,048 A * 3/1988 Clayton, Jr. ......... B23K 26/702
219/121.62
6,300,592 B1 * 10/2001 Ulrich .................... B23K 26/06
219/121.67

FOREIGN PATENT DOCUMENTS

EP 1 669 159 6/2006
FR 1 154 224 4/1958
(Continued)

OTHER PUBLICATIONS

French Search Report and Written Opinion for corresponding FR 1253089, Dec. 12, 2012.
(Continued)

Primary Examiner — Samuel M Heinrich
(74) Attorney, Agent, or Firm — Elwood L. Haynes

(57) ABSTRACT

The invention relates to a nozzle for laser cutting comprising a nozzle body (1) comprising an axial housing (5) and a first outlet orifice (11) situated in the region of the front face (1a) of the nozzle body (1), a mobile element (2) arranged in the axial housing (5) of the nozzle body (1), comprising a skirt-forming front part (2a) and comprising a second outlet orifice (12), said mobile element (2) being able to be moved in a translational movement inside the axial housing (5) toward the first outlet orifice (11) under the effect of a gas pressure applied to the mobile element (2) until such time as the skirt-forming front part (2a) of the mobile element (2) projects out from the axial housing (5) through the first outlet orifice (11), and an elastic element (8) arranged in the axial housing (5), between the nozzle body (1) and the
(Continued)

mobile element (2), applying an elastic return force to the mobile element (2). According to the invention, the front part (2a) comprises an end portion (17) the outside diameter of which decreases progressively toward the second outlet orifice (12). Focusing head and associated laser cutting installation. Laser-beam cutting method employing a nozzle according to the invention, a laser focusing head according to the invention or an installation according to the invention.

13 Claims, 6 Drawing Sheets

(51) Int. Cl.
  *B23K 26/38* (2014.01)
  *B23K 26/08* (2014.01)
  *B23K 26/06* (2014.01)

(58) Field of Classification Search
  USPC .......................... 219/121.67–121.72, 121.84
  See application file for complete search history.

(56) References Cited

FOREIGN PATENT DOCUMENTS

| JP | S61 037393 | 2/1986 |
| JP | S62 006790 | 1/1987 |
| JP | S63 040695 | 2/1988 |
| JP | S63 108992 | 5/1988 |
| JP | H7 251287 | 10/1995 |

OTHER PUBLICATIONS

International Search Report and Written Opinion for corresponding PCT/FR2013/050291, Jun. 17, 2013.

* cited by examiner

LASER NOZZLE WITH MOBILE ELEMENT OF IMPROVED EXTERNAL PROFILE

CROSS REFERENCE TO RELATED APPLICATIONS

This application is a 371 of International PCT Application PCT/FR2013/050291, filed Feb. 13, 2013, which claims priority to French Patent Application No. 1253089, filed Apr. 4, 2012, the entire contents of which are incorporated herein by reference.

BACKGROUND

The invention relates to a laser nozzle that can be used in laser-beam cutting with an internal mobile element including a skirt for concentrating the cutting gas in the cutting groove, that can be better implemented industrially and has an improved service life.

Laser-beam cutting requires the use of a nozzle, usually made of copper, that is used to channel the gas while enabling the laser beam to pass through.

The diameter of the output orifices of the nozzles is typically between 0.5 mm and 3 mm for a working distance of between 0.6 mm and 2 mm.

High pressures, usually several bar, are required in the focusing head for cutting to enable the gas to enter the groove and to remove the molten metal.

A significant part of the gas used, typically between 50% and 90%, has no effect on the cutting process, i.e. on the expulsion of the molten metal, since it flows onto the sides of the cutting groove.

These gas losses are in fact attributable to the huge difference between the area of the valve orifice and the size of the focal spot. By way of example, the area of a nozzle with an output orifice having a diameter of 1.5 mm is 25 times larger than the area of the focal spot created by the laser beam passing through this nozzle.

If an insufficient proportion of gas is used, cutting defects may appear, in particular attached burrs and/or traces of oxidation.

Attempting to resolve this by reducing the diameter of the orifice of the nozzle is not ideal since there is then a risk of the laser beam hitting the inside of the nozzle and damaging it, which would also adversely affect the quality of the cut and/or performance levels.

There are a number of documents proposing different solutions to help the gas to enter the groove, for example EP-A-1669159, JP-A-62006790, JP-A-61037393, JP-A-63108992, JP-A-63040695 and U.S. Pat. No. 4,031,351.

None of these solutions is ideal since the architecture is often complex to implement, they are more bulky than a conventional nozzle and/or they provide limited efficiency.

Notably, document U.S. Pat. No. 4,031,351 discloses a laser cutting nozzle including a mobile element, the extremity of which is pressed by a spring against the surface of the part to be cut to assist the injection of the cutting gas into the groove.

The key drawback to this solution is that the force exerted by the spring in the direction of the sheet, combined with the pressure of the cutting gas, causes the mobile element to exert a significant force on the sheet to be cut. This results in a risk of the sheet being deformed, scratched or even dragged, said sheet normally being simply placed on the table of the industrial cutting machine.

To overcome this, French patent 1154224, filed on May 16, 2011, proposes arranging a mobile element in the body of a laser nozzle. This mobile element can be moved axially within said body, under the effect of a gas pressure and towards the surface of the sheet to be cut. This causes the mobile element to approach the upper surface of the sheet to be cut, before it comes in contact with the sheet, thereby forming a skirt, the external profile of which is cylindrical, on account of which the cutting gas is channeled and concentrated on the groove, which forces the gas to enter the groove and improves the effectiveness thereof.

Furthermore, this nozzle includes an elastic element exerting an elastic return force on the mobile element in a direction tending to move it away from the sheet. Thus, when the gas is cut off, the mobile element can be returned to the idle position thereof and therefore the skirt moves back inside the nozzle body.

However, this solution has several drawbacks, in particular in terms of industrial application.

Indeed, different types of obstacles can be found on the surface of the sheet to be cut and can hinder the movement of the mobile element in the working position thereof, i.e. in contact with the sheet. For example, these may be over-thicknesses of molten metal caused by projections occurring during the drilling and cut initiating phases, or parts already cut out that remain wedged in the sheet and positioned at an angle in relation to the surface of the sheet, i.e. that have a portion located above the level of the upper surface of the sheet. Cuts started from an edge of the sheet can also generate steps or height differences, i.e. differences in level between different portions of the sheet, on account of a defamation or lowering of certain portions of the sheet caused during the cut.

There is then a risk of stop-starting and impacts at the extremity of the skirt located facing the sheet if the peripheral wall of the skirt comes up against any obstacles present on the sheet. The movement of the skirt can be slowed, abruptly braked or even stopped.

If detected by the cutting machine, the impacts with the extremity of the skirt may cause untimely emergency stops of the machine. Such impacts could also damage and affect the efficiency of the skirt, even completely damaging or breaking it. It is then necessary to replace the mobile element of the nozzle, which increases production costs and reduces productivity of the industrial cutting machine.

These problems become even more significant when cutting using "nesting", which is common in industry on account of the material savings achieved, for which the parts cut out from a single sheet are arranged very close to one another, and some parts can even have common edges.

The document JP-A-7251287 proposes a laser nozzle including a mobile element and a spring exerting a force tending to press said element against the sheet. Furthermore, this nozzle uses the force exerted by the cutting gas leaking beneath the surface of said element facing the sheet to be cut to cause a slight distancing of the movable element from the sheet.

However, this solution is difficult to implement since it requires precise control of the different forces in play to adjust and maintain the desired distance. Furthermore, this distancing reduces the effectiveness of the gas injection into the groove. It creates further problems during the steps of the method in which no cutting gas is supplied by the nozzle, or when only a low cutting gas pressure is supplied to the nozzle.

This is in particular the case when drilling the sheet, which is done at low gas pressures, typically less than 4 bar, or when the nozzle is moved quickly above the sheet, at a typical distance of 0.5 mm to several mm which is done without any cutting gas or beam, in particular when several nested parts are cut out of a single sheet. To improve production rate and speed, these operations are usually performed without lifting the device holding the nozzle away from the cutting position thereof.

Under these circumstances, the solution provided in JP-A-7251287 does not enable the mobile element to be moved away from the sheet, and the aforementioned problems become relevant, with the mobile element permanently protruding outside the nozzle body. This also causes a problem in the drilling phases, since the nozzle should not be too close to the sheet on account of the significant quantities of molten metal projected.

Consequently, the problem addressed is proposing a laser-beam cutting nozzle for which the aforementioned problems are significantly reduced or even eliminated, in particular a laser nozzle the movement of which over the cut sheet is significantly less disturbed by any obstacles found on the surface of said sheet, and for which the impacts resulting from the nozzle hitting said obstacles are significantly reduced in relation to the existing solutions.

Furthermore, it must be possible to implement the laser nozzle according to the present invention industrially, and the robustness and service life thereof must be better than the existing solutions, and it must not affect operation of the cutting machine on which said nozzle is installed.

SUMMARY

The solution in the present invention is therefore a laser nozzle including:
- a nozzle body having an axial seat and a first output orifice located at the front face of the nozzle body,
- a mobile element placed in the axial seat of the nozzle body, having a front skirt-shaped portion and having a second output orifice, said mobile element being movable in translation in the axial seat towards the first output orifice under the effect of a gas pressure exerted on the mobile element until the front skirt-shaped portion of the mobile element protrudes outside the axial seat through the first output orifice, and
- an elastic element placed in the axial seat between the nozzle body and the mobile element exerting an elastic return force on the mobile element,
- characterized in that the front portion has an end portion in which the external diameter decreases progressively in the direction of the second output orifice.

As applicable, the nozzle according to the invention may have one or more of the following technical features:
- the front portion also has a cylindrical portion of substantially constant external diameter.
- the end portion has at least one bevel forming an angle ($\alpha$) with the front face of the nozzle body.
- the angle of the bevel is between 0.1° and 80°, and preferably between 10° and 45°.
- the external profile of the end portion is truncated-cone-shaped.
- the external profile of the end portion has at least one curved portion.
- the external profile of the end portion has at least one convex portion.
- the at least one convex portion has a radius of curvature of between 0.1 mm and 2 mm.
- the cylindrical portion has an external diameter of between 3 mm and 8 mm.
- the end portion has an external diameter of between 2.5 mm and 7 mm at the second output orifice.
- when the mobile element moves in translation in the axial seat towards the first output orifice located at the front face of the nozzle body, the front skirt-shaped portion of the mobile element protrudes outside the axial seat through the first output orifice of the front face of the nozzle body.
- the bottom of the axial seat of the nozzle body has a shoulder, and the peripheral wall of the mobile element has a stop, the elastic element being positioned between the shoulder and the stop.
- at least one sealing element is placed between the nozzle body and the mobile element, for example one or more O-rings.
- said at least one sealing element is placed in a peripheral slot made in the external peripheral wall of the mobile element.
- the mobile element can be moved between several different positions including:
- an idle position in which the skirt of the front portion is completely or almost completely withdrawn into the axial seat of the nozzle body, and
- a working position in which the skirt of the front portion protrudes completely or almost completely outside the axial seat of the nozzle body through the first output orifice.
- the axial passage of the mobile element has a conical, truncated-cone or convergent/divergent shape
- the nozzle body is made of an electrically conductive material, in particular copper, brass or similar.
- the mobile element is made in full or in part of an electrically isolating material.
- alternatively, a mobile element is made of an electrically conductive material that is temperature/heat resistant, specifically copper, brass or similar, said isolating element having at least one isolating interface arranged between the nozzle and the wall of the mobile insert. The isolating interface is either a sleeve placed in the nozzle body, or an isolating lining attached to the nozzle body or the mobile element.

The invention also relates to a laser focusing head having at least one focusing optic, for example one or more lenses or mirrors, in particular a focusing lens and a collimation lends, characterized in that it also includes a laser nozzle according to the invention.

The invention also relates to a laser facility including a laser generator, a laser focusing head and a laser-beam conveying device linked to said laser generator and to said laser focusing head, characterized in that the laser focusing head is as claimed in the invention.

Preferably, the laser source or generator is a $CO_2$, YAG, fiber or disk type, preferably fiber or disc, in particular an ytterbium-fiber laser source.

According to another aspect, the invention also relates to a laser-beam cutting method in which a nozzle according to the invention, a laser focusing head according to the invention or a facility according to the invention is used.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1A:
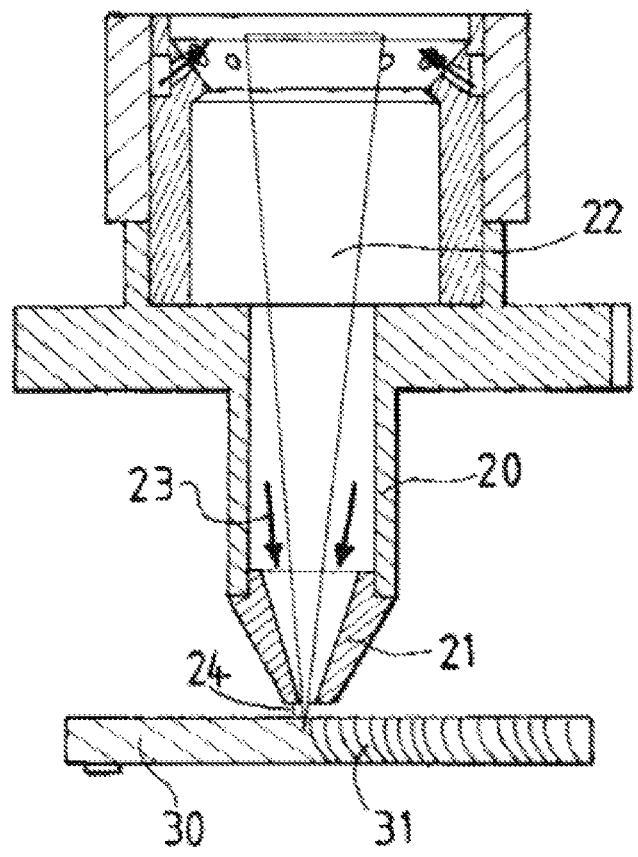
FIG. 1A is a schematic representation of a focusing head of a conventional laser cutting facility.

FIG. 1A shows the focusing head 20 of a conventional laser cutting facility, to which is attached a conventional laser nozzle 21, through which pass a focused laser beam and assist gas (arrow 23) used to expel the metal melted by the beam from the cutting groove 31 formed by the beam 22 in the metal part to be cut 30, for example a steel or stainless-steel sheet.

The assist gas may be an active gas; such as oxygen, air, $CO_2$ or hydrogen; or an inert gas; such as argon, nitrogen or helium; or a mixture of several of these active and/or inert gases. The composition of the gas is chosen in particular in consideration of the nature of the part to be cut.

The beam that impacts the part melts the metal, which is then expelled beneath the part by the pressure of the assist gas.

Figure 1B:
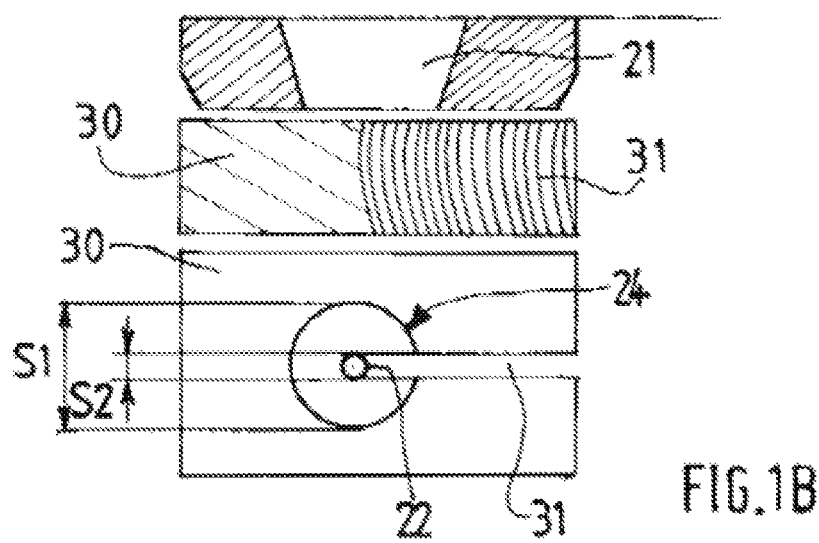
FIG. 1B is a schematic representation of the size of the laser spot in relation to the size of the nozzle orifice.

FIG. 1B clearly shows the area S1 of the orifice 24 of the nozzle 21 in relation to the size S2 of the focal spot of the beam 22. As shown, the area S1 is much greater than the size S2 of the focal spot of the beam 22, which means, in the case of conventional nozzles, a high consumption of assist gas, of which only a small proportion is used to expel the molten metal from the cutting groove 31.

To considerably reduce the gas consumption and the pressure required for cutting, French patent application 1154224 proposes a laser nozzle that is able and designed to cut with a laser beam using a lesser gas pressure and/or gas flow rate on account of a particular nozzle architecture that makes it possible to force a greater proportion of gas into the groove 31 and to efficiently expel the molten metal therefrom, regardless of the laser power and the wavelength of the beam.

Figure 2:
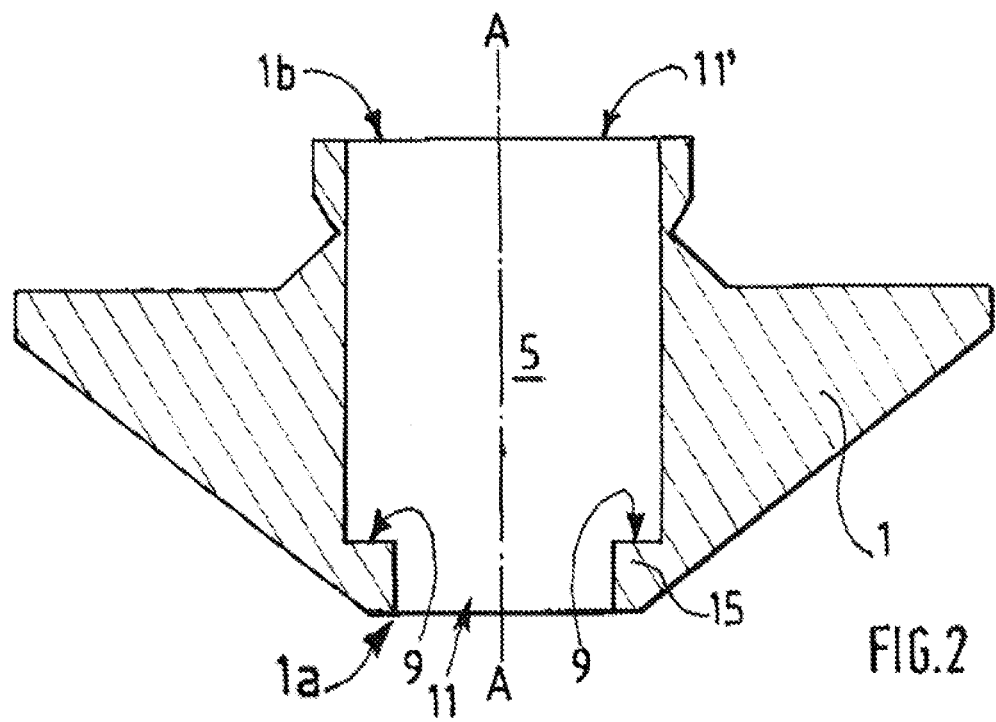
FIG. 2 is a schematic cross-section of the body of a nozzle according to the invention.
Figure 3:
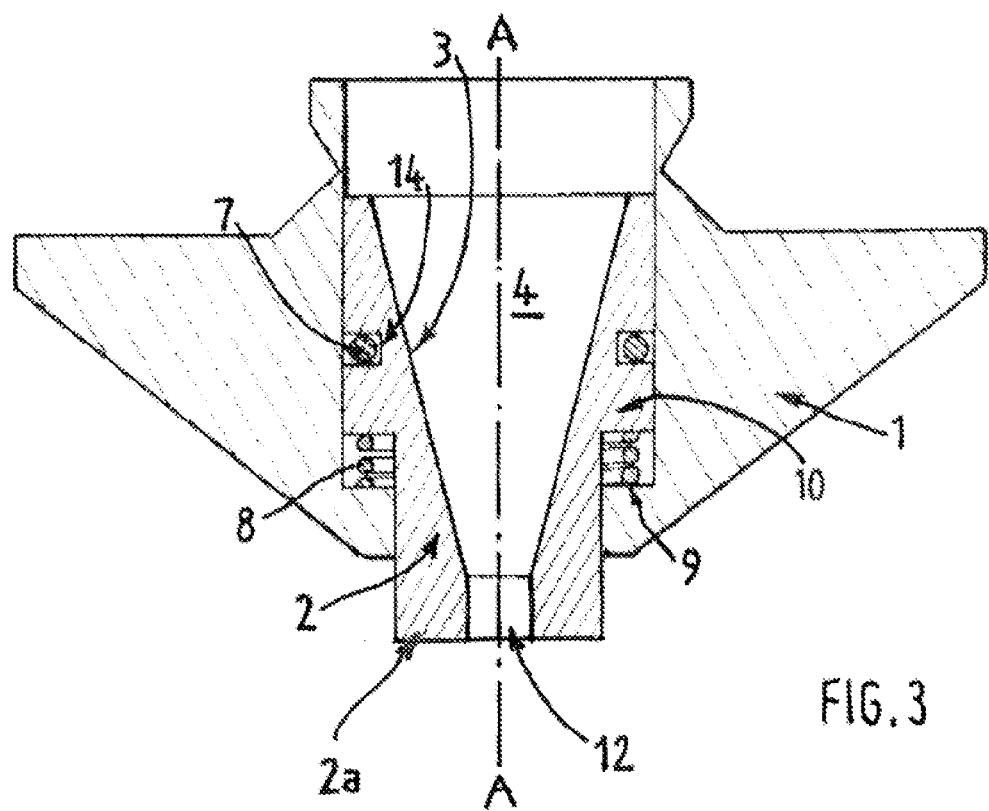
FIG. 3 is a schematic cross-section of a nozzle according to French patent application 1154224.

According to document FR 1154224, the laser nozzle has at least two essential components, namely a nozzle body 1 cooperating with a mobile element 2 arranged movably inside the nozzle body 1, an embodiment of which is shown in FIGS. 2 and 3.

More specifically, as shown in FIG. 2, the nozzle body 1, which is made of a conductive material, for example copper or brass, is designed to be attached to the laser focusing head 20 of the laser facility.

Advantageously, the nozzle body 1 is an axisymmetric part crossed end to end by an axial seat 5 along the axis AA, which extends from the rear face 1b of the body 1 to the front face 1a of said body 1.

The axial seat 5 opens out at the front face 1a and the rear face 1b of the nozzle body 1. The rear face 1b therefore has a first input orifice 11', while the front face 1a has a first output orifice 11 from the nozzle body 1, the first input and output orifices 11', 11 being coaxial to the axis AA.

This axial seat 5 is in fact a recess, for example a cylindrical recess with an internal shoulder 9 projecting radially towards the center of the seat 5, said internal shoulder 9 being formed by a restriction 15 of the area of the axial seat 5 level with the first output orifice 11 located on the front face 1a of the nozzle body 1.

The nozzle in document FR 1154224 also includes a mobile element 2 that is inserted into the seat 5 of the nozzle body 1, preferably coaxially with the body 1, as shown in FIG. 3. This mobile element 2 is able and designed to move in translation along the axis AA inside the seat 5 of the nozzle body 1.

According to document FR 1154224, this mobile element 2 includes a front portion 2a forming a cylindrical (i.e. tubular) skirt 6 arranged in the axial seat 5 of the nozzle body 1 and including an axial passage 4 with a second output orifice 12 opening out from the front portion 2 forming said skirt 6.

While the nozzle is in use, the laser beam 22 and the assist gas 23 pass through the axial passage 4 of the mobile element 2 and come out through the second output orifice 12 opening out from the front portion 2a forming said skirt 6.

The mobile element 2 can be moved axially in relation to the body 1 of the nozzle along the axis AA. Indeed, the mobile element 2 moves under the effect of the pressure of the assist gas 23 that is exerted on said mobile element 2, which tends to push it towards the part to be cut 30.

The translational movement of the mobile element 2 along the axis AA causes the skirt 6 to move towards the upper surface 30 of the sheet to be cut, before they come into contact with one another, as shown in FIG. 4A.

Thus, the gas is channeled by the skirt 6 and is concentrated on the laser spot and therefore the groove, which significantly improves the efficiency thereof and the metal is more effectively expelled.

An elastic element 8, such as a spring, is arranged in the axial seat 5, between the nozzle body 1 and the mobile element 2 such that it exerts an elastic return force on the mobile element 2 in a direction tending to move it away from the part to be cut. Thus, on completion of the cut, when the gas is cut off and the gas pressure is no longer being exerted on the mobile element 2, the latter can be returned to the idle position thereof and therefore the skirt 6 can go back inside the seat 5.

The elastic element 8 therefore makes it possible to limit the wear caused to the skirt 6 during the sheet drilling phases that usually proceed the cutting phases. Indeed, drilling is most commonly undertaken with low gas pressures, typically less than 4 bar. The elastic element then exerts a sufficient return force for the skirt 6 to return completely or almost completely into the seat 5, where it is protected from the projections of molten metal generated by the drilling.

Furthermore, the elastic element 8 facilitates the rapid movement of the cutting head at short distances above the sheet, with no cutting gas or beam, since the gas then ceases to exert pressure on the mobile element and the skirt 6 goes back inside the seat 5. Only the skirt 6 goes back up, and it is not necessary to lift the focusing head holding the nozzle.

According to document FR 1154224, the mobile element 2 has a front portion 2a forming a cylindrical skirt 6, i.e. one with a constant external diameter along the axis AA.

As explained above, this cylindrical shape causes problems if any obstacles, irregularities, overthicknesses or height differences above the level of the top surface of the sheet to be cut are present on the surface of the sheet to be cut, for example caused by projections of molten metal or cut parts that remain wedged in the skeleton of the sheet.

Indeed, in this arrangement, the external peripheral wall of the front portion 2a forms a wall perpendicular to the surface of the sheet to be cut, i.e. vertical, providing relatively significant resistance to obstacles, in particular at the high cutting speeds found in laser cutting, typically between 0.1 and 50 m/min, depending on the thickness of the sheet to be cut. This results in poor absorption of the impacts by the skirt 6 and movement of said skirt that is easily hindered, slowed down, abruptly braked or even stopped. In other words, the external cylindrical profile of the skirt encourages frontal impacts with the external surface of said skirt and any obstacles on the sheet.

Furthermore, the presence of a sharp edge at the extremity of the front portion 2a, as shown in FIG. 3, is more liable to start a crack in or rupture of the skirt 6 in the event of impact, making the mobile element 2 more fragile.

To overcome this, the present invention proposes a laser nozzle with an improved mobile element, which in particular has a front skirt-shaped portion 2a that is able and designed to move over obstacles, irregularities or height differences when the mobile element is in the working position thereof, i.e. in contact with the upper surface of the sheet to be cut.

More specifically, the front portion 2a of said mobile element includes an end portion designed to pass over a height difference or an obstacle with or without a significantly reduced impact on the skirt 6, and with no or very little reduction in the movement speed of the nozzle.

According to the invention, the front portion 2a has an end portion 17 in which the external diameter lessens progressively in the direction of the second output orifice 12. Consequently, the front portion 2a is designed to help it to pass over height differences or obstacles on the surface of the sheet. The impacts are better absorbed since the progressive reduction in the external diameter of the end portion 17 helps the skirt 6 to move back up towards the seat 5 when the skirt 6 encounters a height difference or a one-off obstacle.

End portion means a portion of the front portion 2a located at the extremity of said front portion, i.e. facing the upper surface of the sheet to be cut.

In one embodiment of the invention, the end portion 17 has at least one bevel 18 forming an angle (α) with the front face 1a of the nozzle body 1. The angle α of the at least one bevel 18 is between 0.1° and 80°, and preferably between 10° and 45°.

Figure 4:
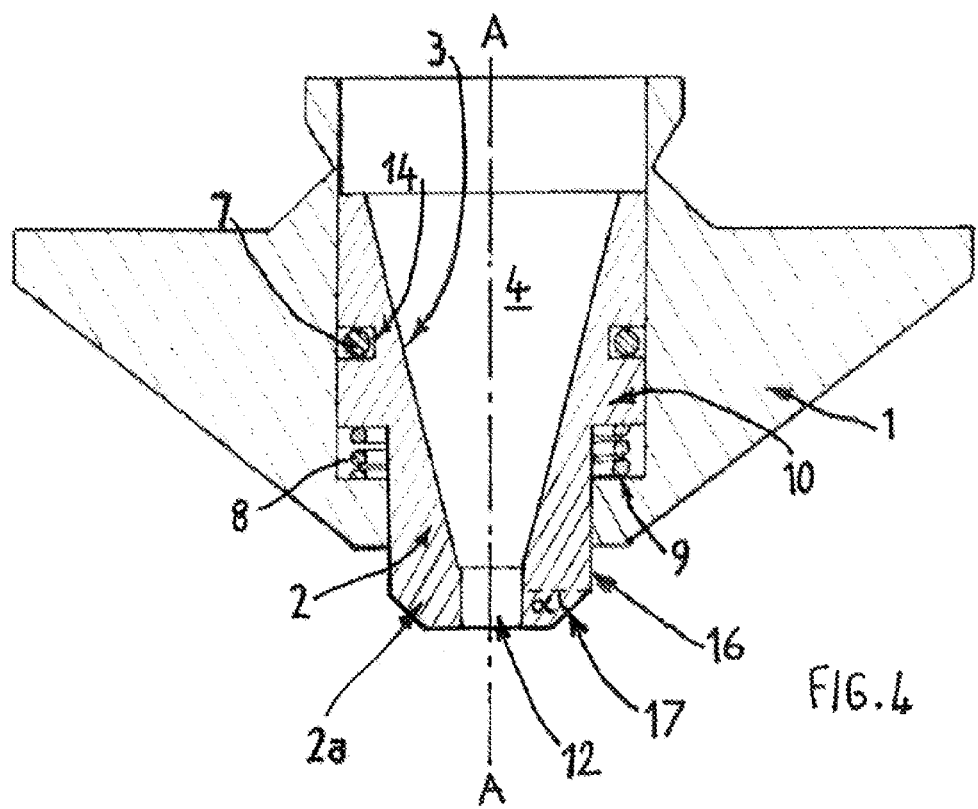
FIG. 4 is a schematic cross-section of a nozzle according to one embodiment of the invention.

In the example shown in FIG. 4, the end portion 17 includes a single bevel 18. Preferably, the external profile of the end portion 17 is truncated-cone-shaped.

Advantageously, the front portion 2a also includes a cylindrical portion 16 of substantially constant external diameter, preferably arranged upstream of the end portion 17, i.e. further away from the second output orifice 12 than the end portion 17.

Figure 5:
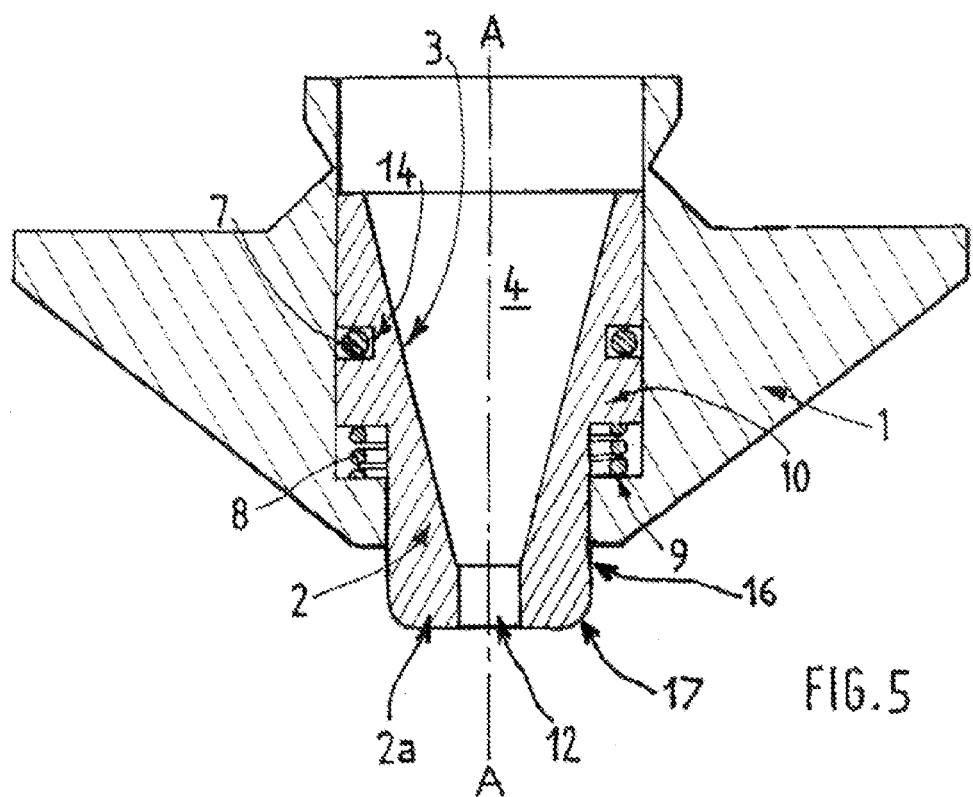
FIG. 5 is a schematic cross-section of the body of a nozzle according to another embodiment of the invention.

In another embodiment, shown in FIG. 5, the external profile of the end portion 17 has at least one curved portion. Preferably, the external profile of the end portion 17 has at least one convex portion. The radius of curvature of the at least one convex portion is typically between 0.1 mm and 2 mm.

The present invention therefore makes it possible to eliminate or largely limit the presence of sharp edges at the end of the front portion 2a.

The cylindrical portion 16 preferably has an external diameter of between 3 mm and 8 mm, and preferably around 6 mm.

At the second output orifice 12, i.e. at the end face of the front portion 2a facing the sheet to be cut, the end portion 17 has an external diameter of between 2.5 and 7 mm, preferably around 4 mm.

It should be noted that the external peripheral wall of the mobile element 2 has a stop 10, preferably an annular stop extending around all or part of the periphery of said mobile element 2, the elastic element 8 being positioned between the shoulder 9 and the stop 10.

Optionally, at least one sealing elements 7 is arranged between the nozzle body 1 and the mobile element 2, in particular one or more O-rings 7, which makes it possible to provide a seal between the nozzle body 1 and the mobile insert 2. Preferably, said at least one sealing element 7 is placed in a peripheral slot 14 made in the external peripheral wall of the mobile element 2.

As shown in FIGS. 4 and 5, the nozzle according to the invention is of standard size, i.e. it is not larger than a conventional cutting nozzle, which is advantageous and compatible with nested cutting, in which parts are taken from a single sheet with very limited gaps between different parts.

Furthermore, the nozzle according to the invention has the other advantage of being compatible with capacitive sensor systems. Indeed, the part made of copper or another conductive material is adapted to the height specified by the capacitive sensor, as in a standard nozzle. It is the mobile insert 2 that, under the pressure of the gas, comes into contact with the sheet 30 to be cut, thereby enabling gas leaks to be limited.

The mobile element 2 is preferably made of an electrically isolating, composite, technical ceramic, polymer material, for example polyether ether ketone (Peek), Vespel®, ceramic or Pyrex, and has the same internal geometry as a laser cutting nozzle, i.e. it may have an internal profile that is conical, with or without a cylindrical output channel, truncated-cone-shaped, convergent/divergent (i.e. de Laval nozzle) or any other suitable geometry.

It should be noted that electrically isolating material means a material that does not conduct electricity, i.e. that prevents electrical current from passing between two electrically conductive elements.

Preferably, the mobile element 2 is an axisymmetric part formed from a single block of material.

If the mobile element 2 is not made of an electrically isolating material, at least one portion of the external surface of the mobile element 2 is covered with a layer of electrically isolating material, which may or may not be rigidly connected to the mobile element 2. This layer of isolating material is then used as an electrically isolating interface between the mobile element 2 and the nozzle body 1.

Furthermore, the nozzle according to the invention includes a mobile element 2 in which the diameter of the output orifice 12 is between 0.5 mm and 5 mm.

Figure 6B:
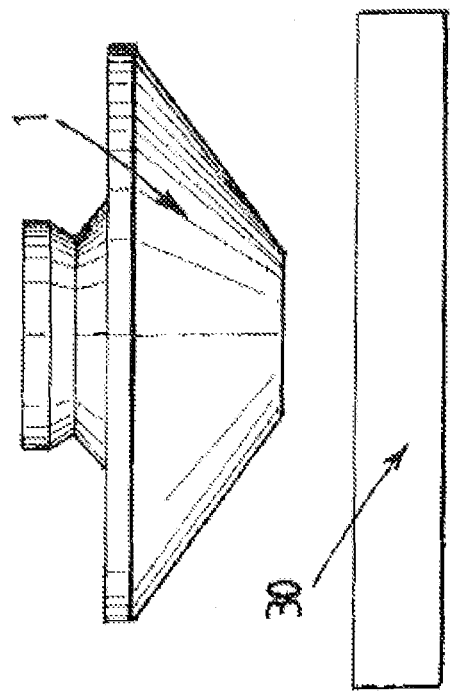
FIGS. 6A and 6B show the nozzle according to the invention with the mobile element in two different positions.
Figure 6A:
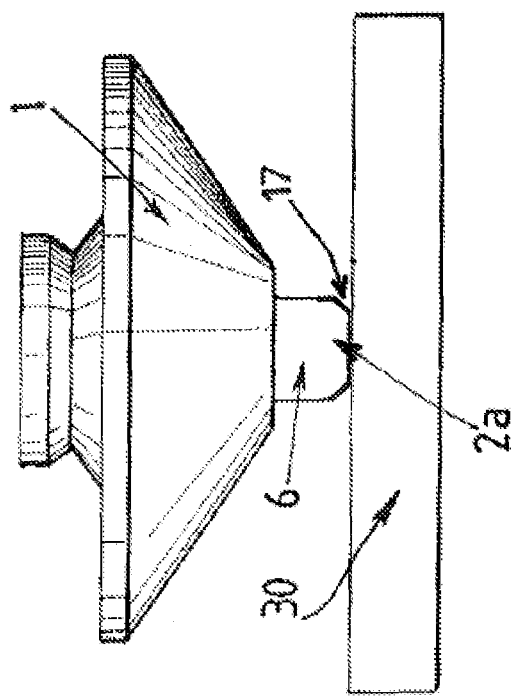

Indeed, the mobile element 2 of the nozzle according to the invention is therefore able to move between several positions including at least:
  an idle position in which the skirt 6 of the front portion 2a is completely or almost completely withdrawn into the axial seat 5 of the nozzle body 1, as shown in FIG. 6B, and
  a working position in which the skirt 6 of the front portion 2a protrudes completely or almost completely outside the axial seat 5 of the nozzle body 1 through the first output orifice 11, and comes into contact with the part to be cut, as shown in FIG. 6A.

Naturally, the mobile element 2 can occupy intermediate positions in which the skirt 6 protrudes only partially outside the axial seat 5 of the nozzle body 1. These intermediate positions can notably depend on the pressure exerted by the gas on the mobile element 2.

Indeed, the combination of the specific external profile of the extremity of the front portion 2a with the arrangement of the elastic element 8 provides an even greater improvement to operation of the nozzle according to the invention.

Firstly, the shape of the end portion enables the skirt 6 to pass over a height difference or a one-off obstacle by enabling the skirt to move back into the seat 5, thereby avoiding frontal impacts with the obstacles on the sheet.

Figure 7:
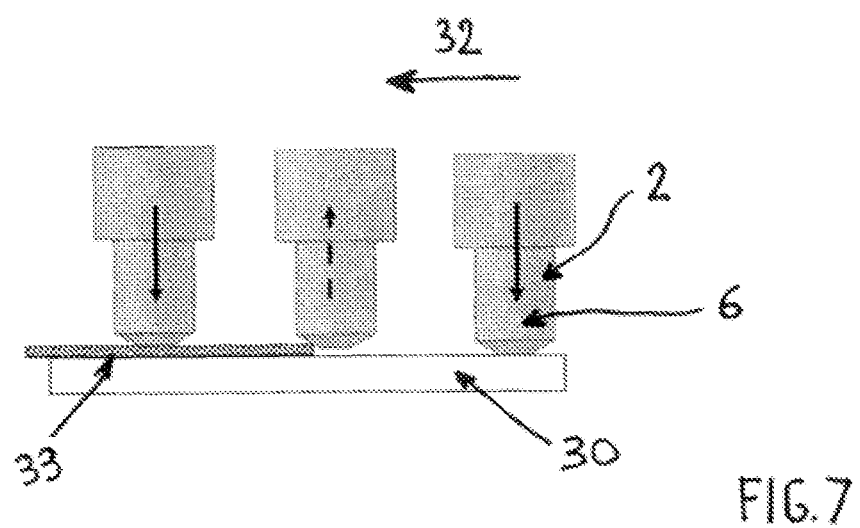
FIG. 7 shows the movement of the mobile element of a nozzle according to the invention over a height difference.

This is shown in FIG. 7, where the mobile element 2 is shown schematically with the skirt 6 thereof (body 1 omitted for the sake of clarity) moving over a sheet to be cut 30 in a cutting direction 32. In the absence of any obstacles, the skirt 6 moves in contact with the sheet on account of the pressure exerted by the cutting gas on the mobile element 2, represented by the unbroken arrow (_____). As shown, when an obstacle or a height difference is encountered, in this case a height difference or a step simulated by a part 33 placed on the sheet 30, the raising of the skirt 6, shown by the dotted arrow ( - - - ) is facilitated by the bevel formed on the end portion 17. Once above the obstacle 33, the skirt 6 approaches the surface of the obstacle 33 and continues channeling the cutting gas into the groove.

Furthermore, the elastic element 8 makes it possible to limit the pressure exerted by the mobile element 2 on the part to be cut when same is moving towards the part under the effect of the cutting gas. More specifically, the return force of the elastic element 8 is advantageously dimensioned such as to hold the mobile element 2 in contact with the part to be cut, while limiting the pressure that said element exerts on the sheet, such as to significantly minimize or even eliminate any risk of the sheet from which the part is being cut being deformed, the surface of the sheet being scratched, and the sheet being dragged.

In this way, the present invention provides greater flexibility of movement for the skirt 6 and enables it to follow the variations in level that may occur on the surface of the sheet to be cut, which facilitates the industrial use thereof.

This limits the risk of the machine being stopped as a result of obstructions to the movement of the head and abrupt impacts between the skirt and obstacles.

The solution provided by the present invention therefore results in a nozzle with a movable element in which the robustness, service life and implementation are improved in relation to a nozzle according to document FR 1154224.

EXAMPLES

In order to demonstrate the efficiency of the nozzle according to the invention in relation to a standard nozzle, i.e. a conventional nozzle with no mobile element, and therefore of forcing the gas into the cutting groove by implementing a skirt mounted on a mobile element, comparative tests can be carried out using a cutting facility with a $CO_2$ laser generator to generate a laser beam that is carried to a laser focusing head including focusing optics, specifically lenses.

As applicable, the laser focusing head is fitted with a standard nozzle with an output orifice with a diameter of 1.8 mm or a nozzle according to FIG. 3 with a cylindrical mobile skirt and a conical axial passage with a cylindrical output channel with a diameter of 1.8 mm. Furthermore, the external profile of the movable skirt includes a bevel with an angle $\alpha$ of approximately 30° from horizontal, i.e. from the front face of the nozzle body.

The assist gas used is nitrogen.

The sheet to be cut is 304L grade stainless steel 5 mm thick.

Furthermore, a height difference of 0.8 mm is simulated on a zone of the sheet to be cut, covering a portion of the sheet to be cut with another piece of sheet 0.8 mm thick, as shown schematically in FIG. 7.

The laser beam has a power of 4 kW and the cutting speed is 2.6 m/min.

The results obtained demonstrate that:

with the standard nozzle, a gas pressure of 14 bar is not enough to obtain a quality cut. Indeed, at 14 bar, the cut edges have numerous attached burrs. This demonstrates that the evacuation of the molten metal is imperfect on account of an inadequate action of the gas on the molten metal to be expelled. To eliminate these burrs, a pressure of 16 bars was required.

with the nozzle according to the invention, tests carried out at pressures of between 1 and 5 bar resulted in cuts of good quality, i.e. in cut edges with no attached burrs. The skirt of the nozzle makes it possible to channel the gas into the groove and to efficiently expel the molten metal. Furthermore, the nozzle easily passes over the simulated 0.8 mm height difference on the sheet with no stop-starting or excessive reduction in the cutting speed when passing over the height difference. It should be noted that 0.8 mm is typically the maximum height of height differences or obstacles encountered on a sheet cut using a laser beam.

These tests clearly show the efficiency of a nozzle according to the invention, which helps to considerably reduce the gas pressures required compared to a standard nozzle, all conditions being equal, and therefore to reduce gas consumption.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A laser nozzle comprising:
   a nozzle body having an axial seat and a first output orifice located at the front face of the nozzle body,
   a mobile element placed in the axial seat of the nozzle body, having a front skirt-shaped portion and having a second output orifice, said mobile element being movable in translation in the axial seat towards the first output orifice under the effect of a gas pressure exerted on the mobile element until the front skirt-shaped portion of the mobile element protrudes outside the axial seat through the first output orifice, and
   an elastic element placed in the axial seat between the nozzle body and the mobile element exerting an elastic return force on the mobile element,
   wherein the front portion has an end portion in which the external diameter decreases progressively in the direction of the second output orifice.

2. The nozzle of claim 1, wherein the front portion also has a cylindrical portion of substantially constant external diameter.

3. The nozzle of claim 1, wherein the end portion has at least one bevel forming an angle a with the front face of the nozzle body.

4. The nozzle of claim 1, wherein the angle a of the bevel is between 0.1° and 80°.

5. The nozzle of claim 1, wherein the external profile of the end portion is truncated-cone-shaped.

6. The nozzle of claim 1, wherein the external profile of the end portion has at least one curved portion.

7. The nozzle of claim 1, wherein the external profile of the end portion has at least one convex portion.

8. The nozzle of claim 7, wherein the at least one convex portion has a radius of curvature of between 0.1 mm and 2 mm.

9. The nozzle of claim 1, wherein the cylindrical portion has an external diameter of between 3 mm and 8 mm.

10. The nozzle of claim 1, wherein the end portion has an external diameter of between 2.5 mm and 7 mm at the second output orifice.

11. A laser focusing head having at least one focusing optic, comprising a laser nozzle according to claim 1.

12. A laser facility including a laser generator, a laser focusing head and a laser-beam conveying device linked to said laser generator and to said laser focusing head, comprising the laser focusing head of claim 11.

13. The facility of claim 12, wherein the laser generator is a $CO_2$, YAG, fiber or disk laser generator.

* * * * *